(12) United States Patent
Mueller

(10) Patent No.: US 6,354,772 B1
(45) Date of Patent: Mar. 12, 2002

(54) CUTTING TOOL

(76) Inventor: Paul W. Mueller, 368 Bluff City Blvd., Elgin, IL (US) 60120

( * ) Notice: Subject to any disclaimer, the term of this patent is extended or adjusted under 35 U.S.C. 154(b) by 0 days.

(21) Appl. No.: 09/206,757

(22) Filed: Dec. 7, 1998

(51) Int. Cl.[7] .............................................. B23B 51/00
(52) U.S. Cl. ......................... 408/152; 407/37; 407/45; 408/153; 408/713
(58) Field of Search ...................... 408/7 R, 93, 152, 408/153, 91, 187, 173, 713; 407/36, 37, 44, 45, 53, 81, 84, 90

(56) References Cited

U.S. PATENT DOCUMENTS

| | | | | | |
|---|---|---|---|---|---|
| 560,050 A | * | 5/1896 | Stone | .......................... | 408/152 |
| 1,468,827 A | * | 9/1923 | Morris | ........................ | 408/152 |
| 2,215,344 A | * | 9/1940 | Albrecht | ...................... | 145/127 |
| 2,227,085 A | * | 12/1940 | Hassig | ............................ | 77/58 |
| 2,319,467 A | * | 5/1943 | Morgan | .......................... | 77/58 |
| 2,338,073 A | * | 12/1943 | Behr | .............................. | 77/58 |
| 2,365,648 A | * | 12/1944 | Rossman | ...................... | 77/73.5 |
| 2,945,426 A | * | 7/1960 | Buchan | ............................ | 90/11 |
| 2,953,950 A | * | 9/1960 | Briney, Jr. et al. | .............. | 77/58 |
| 3,148,561 A | * | 9/1964 | Krampert | ........................ | 77/58 |
| 3,154,974 A | * | 11/1964 | Greenleaf | ........................ | 77/58 |
| 3,313,187 A | * | 4/1967 | Benjamin et al. | .............. | 77/58 |
| 3,647,307 A | * | 3/1972 | Kosker | .......................... | 408/181 |
| 4,097,181 A | * | 6/1978 | Fisher | .......................... | 408/187 |
| 4,227,841 A | * | 10/1980 | Hoover | .......................... | 408/197 |
| 4,243,348 A | * | 1/1981 | Paige | ............................ | 408/186 |
| 4,353,670 A | * | 10/1982 | Jorgensen | .................... | 408/193 |
| 4,621,958 A | * | 11/1986 | Ewing | .......................... | 408/232 |
| 4,847,961 A | * | 7/1989 | Donovan et al. | ............. | 29/56.5 |
| 4,854,789 A | * | 8/1989 | Eveanko, Jr. | .................. | 408/125 |
| 4,933,868 A | * | 6/1990 | McMurty | ............... | 364/474.02 |
| 5,320,458 A | * | 6/1994 | Reiterman et al. | ........... | 408/180 |
| 5,454,667 A | * | 10/1995 | Cirino et al. | ................ | 408/181 |
| 5,516,242 A | * | 5/1996 | Andronica | .................... | 408/59 |

* cited by examiner

*Primary Examiner*—Daniel W. Howell
(74) *Attorney, Agent, or Firm*—Dillis V. Allen, Esq.

(57) ABSTRACT

A cutting tool having a shank held in a chuck. Mounted in the shank is an insert holder and a carbide insert held therein. The insert holder extends radially beyond the shank, with the insert on its extended end. The insert can be adjusted as to radial extension, by swingable adjustment, and held in adjusted position by tightening the holder. A gear is provided for swinging the holder, and a visual dial is provided to show the position of adjustment.

4 Claims, 2 Drawing Sheets

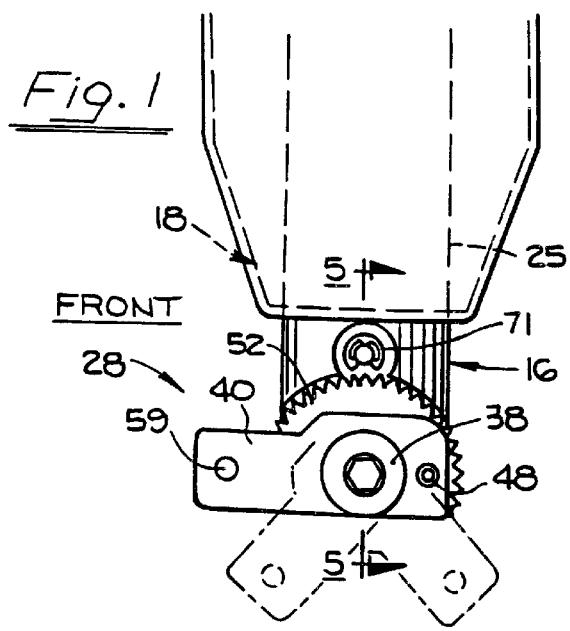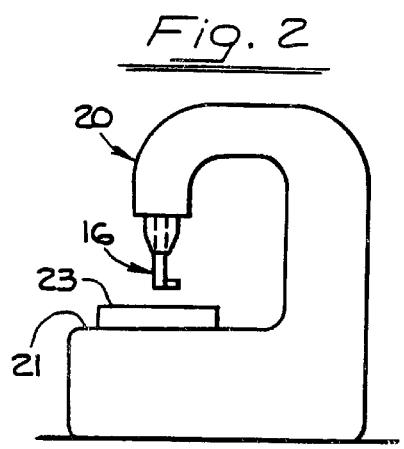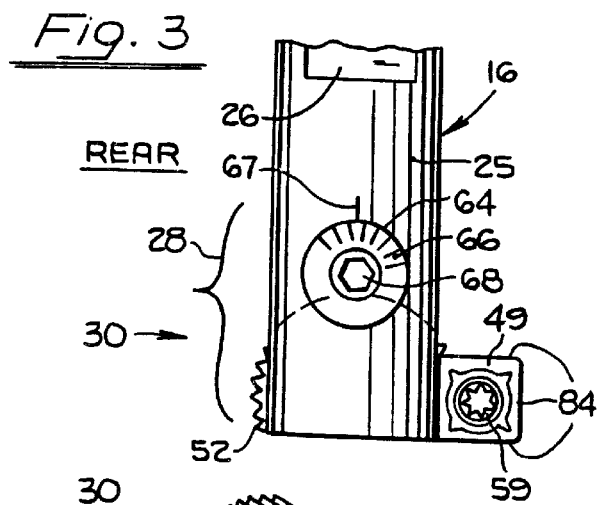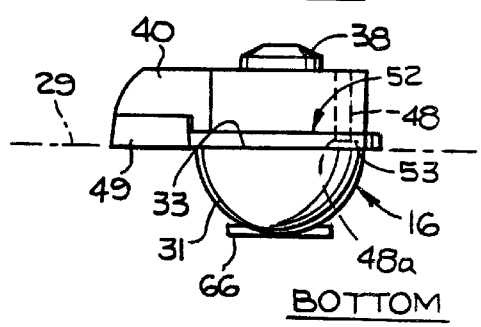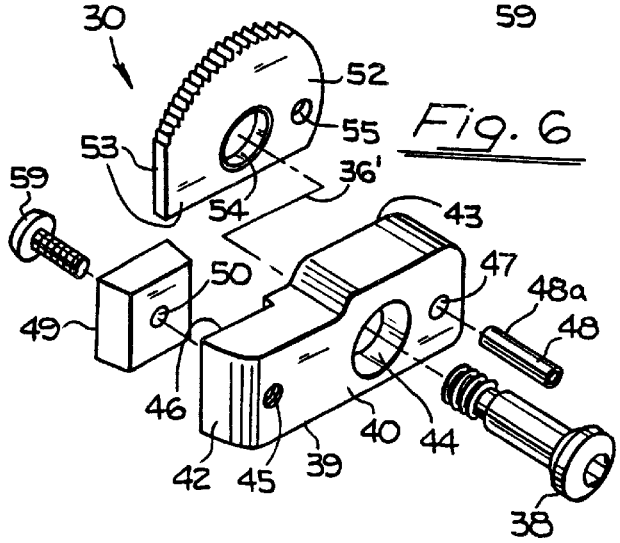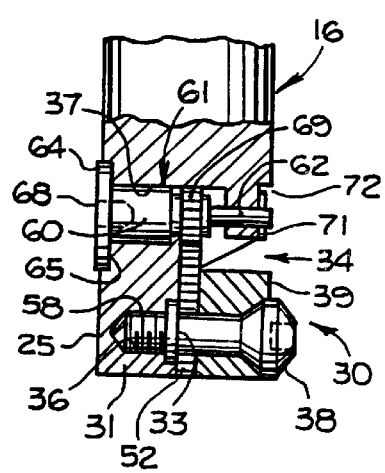

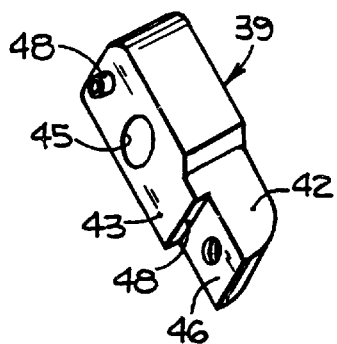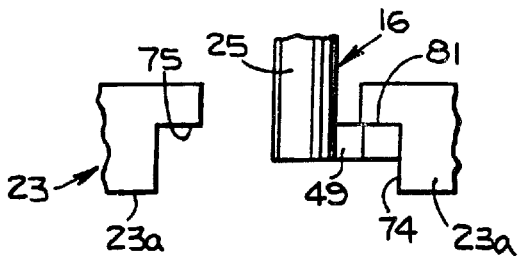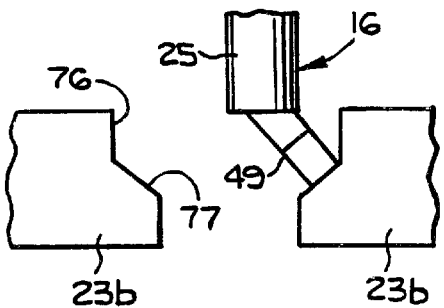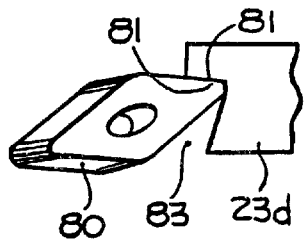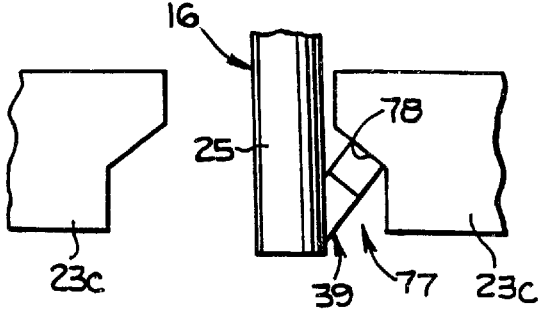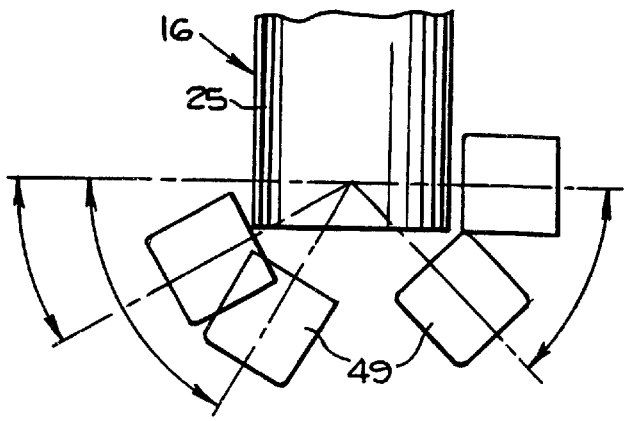

CUTTING TOOL

FIELD OF THE INVENTION

The invention resides in the field of cutting tools for use in cutting various shapes in workpieces, and where the cutting inserts or bits need to be changed or adjusted as the work progresses.

OBJECTS OF THE INVENTION

A main object of the invention is to provide a cutting tool of the foregoing character having the following features and advantages:

1. The cutter inserts can be quickly and easily changed or adjusted.

2. The changing and adjusting of the cutter inserts can be made without removing the tool from the holder, in the milling machine in which it is mounted. The cutter insert can be changed, without affecting the holder in which it is held, or without affecting the positioning of the cutter insert for continuing a particular cutting operation.

3. The tool has internal or built-in adjusting means, and gripping means; the gripping means can be loosened and adjustments made, and the gripping means again tightened without requiring replacement of any of the components.

4. The cutting tool can be used in a standard boring machine, in substitution for a standard tool cutter.

5. The cutting tool is made up of a single shank, with all other elements either incorporated in or mounted on the shank itself.

BRIEF DESCRIPTION OF THE INDIVIDUAL FIGURES OF THE DRAWINGS

FIG. 1 is a side view of the cutting tool in a holder or chuck, the latter being shown in phantom lines.

FIG. 2 is a side view of a machine with the tool of the invention mounted therein.

FIG. 3 is a side view of the tool, from the side opposite that of FIG. 1.

FIG. 4 is a bottom view of FIG. 1.

FIG. 5 is a sectional view taken at line 5—5 of FIG. 1.

FIG. 6 is an exploded view of the elements of the cutting tool, other than the shank, detached from the shank.

FIG. 7 is a perspective view of the insert holder from the side opposite that of FIG. 6.

FIG. 8 is a view of the cutting tool in association with a workpiece showing the cutter insert in a first position.

FIG. 9 is a view similar to FIG. 8 but showing a different kind of cut being made in a workpiece, with the cutter bit in corresponding and different position.

FIG. 10 is a view similar to FIGS. 8 and 9 showing still a different cutting shape being cut in a workpiece.

FIG. 11 is perspective view of another form of cutter insert in association with a workpiece.

FIG. 12 is a diagrammatic illustration of different positions in which the cutter bit can be placed, throughout a wide range.

DETAILED DESCRIPTION OF THE DRAWINGS

Referring in detail to the drawings, and particularly FIGS. 1–4, the cutting tool of the invention is shown in its entirety at 16, mounted in a holder or chuck 18, of known kind, which is mounted in a boring machine 20, also of known kind. The boring machine has a bed 21 on which is positioned a workpiece 23 in which a cutting operation is to be performed. The workpiece will be referred to later in connection with the types of cutting operations that the cutting tool performs.

The cutting tool 16 (FIG. 3) includes a cylindrical shank 25 having one or more flats 26 for securing the tool in the holder.

The characteristic features of the cutting tool of the invention are contained in the shank at the lower portion thereof, indicated at 28. This portion of the shank is shaped to accommodate components or elements indicated in their entirety at 30 in FIGS. 5 and 6 and shown in varying degrees in FIGS. 1, 3–5.

The lower end of the shank is cut on a diametrical plane 29 (FIG. 4) forming a jaw 31 having a radially directed face 33, and forming a notch 34 (FIG. 5) in which certain of the components 30 are mounted as described hereinbelow. The jaw is provided with a tapped hole 36, perpendicular to the face 33 for receiving a screw 38 (FIG. 5) for mounting the components positioned in the notch 34.

Above the notch 34, and perpendicular to the face 33 is a diametrical hole 37 in which are mounted others of the components of the device as described below.

The components 30 in FIG. 6 include an insert holder 39, which itself includes a body 40 having an end extension 42, and having an inner face 43. The insert holder is provided with a central hole 44, and a tapped hole 45 in the extension 42. The inner face 43 includes a notch or recess 46, and additionally, a hole 47 in which a locking pin 48 is fixedly fitted in place, for functioning in the locking effect as referred to below.

Among the components 30 of FIG. 6, is also a carbide insert 49 having a central hole 50. This insert is the immediate element performing the cutting operation.

The components 30 of FIG. 6 include a main gear 52, which may be of brass, and of less than full circular shape, having flat edges 53, and is provided with a central hole 54 and an eccentric recess 55.

The components of FIG. 6 are mounted in the notch 34, the gear 52 being fitted against the flat face 33, and the insert holder 39 fitted to the gear. The screw 38 is fitted through the holes 44, 54, and threaded into the tapped hole 36 (FIG. 5) clamping the gear 52 between the insert holder and the jaw 31, in secure position.

The carbide insert 49 (FIG. 6) is fitted in the recess 46, and held therein by a screw 59, fitted through the hole 50 and threaded into the tapped hole 45. This clamping action holds the insert in proper position, aided by the side edge of the recess 46. The insert holder and the carbide insert, together may be referred to as a bit, for convenience, particularly in the claims.

Above the notch 34 (FIG. 5), in the hole 37, is a pin 61 having a main large portion 60, and a reduced inner terminal end 62. The pin has a head 64 positioned in a countersunk hole 65 in the shank. The head serves as a visual dial member, having a dial face 66 (see also) (FIG. 3) on its outer surface. The head 64 has a central socket 68, e.g. of hex shape, for receiving a wrench for turning the pin.

Mounted on the pin 61 is a pinion gear 69, in mesh with the main gear 52, the pin 61 being held in position by a C-ring washer 71 received in a socket 72 formed in the shank. The pinion gear 69 is secured to the pin for rotation therewith.

In the beginning of a cutting operation, a carbide insert 49 is selected according to the nature of the work to be performed. This insert is then secured to the insert holder 39 in the manner set out above. Then the screw 38 is inserted in the hole 44, and the gear 52 fitted on the screw. This assembly of components is then fitted to the flat face 33 of the jaw 31, and the screw 38 tightened into the tapped hole 36. This then secures the assembly all in proper immovable position. The screws 38, 59 may be provided with desired kerfs for receiving a suitable wrench.

In assembling the components as just described, the,main gear 52 is fitted in position with the lower flat edge 53 thereof in register with the lower edge of the holder 39. The pin 61, when the lower assembly is not in position, is freely rotatable, and for the original assembly, preferably that pin is positioned with the dial 66 in a zero position indicated by a zero mark 67 on the shank. Then the components of FIG. 6 are put in place and in this step the main gear is meshed with the pinion gear in the zero position of the dial. Then the screw 38 is tightened and all elements are held tight in such position, the main gear being gripped between the bit holder and the jaw 31 as referred to. The locking pin 48 is fixedly fitted in the hole 47, with an inner end portion 48a of the pin extended through the inner face 43 (see FIGS. 6 and 4) and fitted into the hole 55 in the main gear. This locks the insert holder 39 for rotation with the main gear 52.

In such a beginning step, assumed for convenience, the holder 39 would be in a position generally perpendicular to the shank 16 (FIGS. 1, 3). FIGS. 8–11 show different kinds of cuttings to be made in workpiece 23. Workpiece identified above is shown in these figures, with respective postscripts 23a, 23b, 23c, 23d, indicating different shapes of bores to be cut. Referring first to FIG. 8, the workpiece 23a is to be provided with an undercut bore 74 and for this cutting, the cutting tool 16 is shown corresponding to FIG. 3, where the insert 49 cuts upwardly against a surface 75. FIG. 9 shows another shape of bore to be formed in the workpiece 23b. The bore in this case is indicated at 76, having an upper counterbore and a diagonal shoulder 77. To form such a counterbore, the insert holder 39 is moved to a diagonal position, extending radially outwardly and axially downwardly, a oriented in FIG. 2. This adjustment of the insert is made by loosening the clamping screw 38 (FIGS. 5, 6) and then turning the pin 61 to turn the pinion 69 and thereby turn the main gear 52 to put the insert 49 in the desired position of FIG. 9. The exact positioning of the insert is indicated by the dial 66 (FIG. 3) and when the desired setting is made, the clamping screw 38 (FIGS. 6, 4) is again tightened, holding the insert holder and insert as desired. In fitting the components together, the pin 48 in the holder 39 enters the recess 55 in the main gear as referred to above.

FIG. 10 shows still another workpiece 23c in which a counter cut is produced at 77, forming a generally downwardly diagonal shoulder 78. The insert holder 39 is then adjusted to the desired position to form the cutting at the angle of the shoulder 78 as shown, this exact setting being indicated again by the dial 66 (FIG. 3) as in the other cases, FIGS. 8, 9, described above.

FIG. 11 represents the ease of utilizing any of a wide range of carbide inserts. In this case a diamond shape insert 80 is used, having a relatively pointed corner 81. In the case of cutting a bore shaped as in FIG. 8, the desired cutting action is only at the line 81, but the cylindrical shape of the bore at 74 chokes the space desired in the cutting action. To overcome this objection, the insert 80 of FIG. 11 may be utilized, leaving a space 83 between the adjacent edge of the insert and the cylindrical shape of the bore, providing more free and accurate movement of the insert.

Each insert 49 has a plurality of cutting edges 84 on its periphery, and it may be mounted in different positions around an internal central axis, on the insert holder, to present the selected cutting edge for engagement with the workpiece. This positioning adds greatly to the selective positioning of the insert holder for an infinite number of positions of the insert.

It will be seen that the adjustments can be made easily in the cutting tool by simply loosening the clamping action of the insert holder 39, then making the new adjustment by simply rotating the pin 61 (FIG. 5) by a suitable key, and then again clamping the insert holder. The cutting tool of the invention consists entirely of the shank and the elements carried thereby. No reliance is had between those elements and any fixed portion of the machine in which the device is incorporated, for adjustments of the cutting tool.

Not only can an adjustment be made in the insert as just described, but a replacement of the insert may be made in a simple manner. For this step, the insert 49 (FIG. 6) is simply removed from the holder 39 and a different insert put in place. This may be done without changing, or further adjusting, the holder 39, rendering the step an extremely simple operation. However, it may be desired to make a further adjustment, after changing the insert, because of the nature of the replacement insert for adapting to the desired new shape to be cut.

When an adjustment is made in the cutting tool, for the purpose of making a different portion of a shape according to the setting in the machine 20, such adjustment may be made without disturbing or necessitating changes in the setting in the machine. This is a great advantage, limiting the changes to the elements in the cutting tool itself, without making any changes or adjustments in the machine.

FIG. 12 shows diagrammatically various positions the insert 49 can assume for making different kinds of cuts within a wide range, by simple adjustments. Also, the inserts can be changed by a simple operation, by merely removing the screw 59, manually fitting the substitute insert in place, and replacing the screw and tightening it.

What is claimed is:

1. A cutting tool adapted to be mounted in a chuck that has a longitudinal rotational axis, comprising, a shank constituting the part of the cutting tool that is mounted in the chuck and when so mounted being co-axial with the chuck and extending axially there beyond, the extended end of the shank having a notch forming a jaw with a diametrical flat face, an insert holder constituted by a solid block and having an inner end mounted on the flat face of the extended end of the shank, and an outer end extending radially beyond the shank, an insert mounted on the outer end of the insert holder for engaging a workpiece, the insert holder being so mounted for swinging movement on a second axis extending transversely through the insert holder and the shank, a flat main gear fitted between the flat face and the insert holder, screw means extending at least partially through the insert holder, the main gear, and the shank, and being rotatable on the second axis, for mounting the insert holder on the shank with the main gear gripped between the flat face and insert holder, and means extending to the exterior for manipulation by a user for swinging the insert holder on the second axis.

2. A cutting tool according to claim 1 and including, means positively interconnecting the main gear and insert holder for positively swinging the insert holder in response to rotation of the main gear.

3. A cutting tool according to claim 1, wherein, the means extending to the exterior includes a pinion operably engaged with the main gear.

4. A cutting tool according to claim 3, and including, a visual dial operably mounted on the pinion, and visual index means on the dial and shank for indicating settings or the insert holder and thereby the settings of the insert in the insert holder.

* * * * *